United States Patent
Matthews et al.

(10) Patent No.: US 6,615,804 B2
(45) Date of Patent: Sep. 9, 2003

(54) METHOD AND APPARATUS FOR DEACTIVATING AND REACTIVATING CYLINDERS FOR AN ENGINE WITH DISPLACEMENT ON DEMAND

(75) Inventors: Gregory Paul Matthews, West Bloomfield, MI (US); Charles Henry Folkerts, Troy, MI (US)

(73) Assignee: General Motors Corporation, Detroit, MI (US)

( * ) Notice: Subject to any disclaimer, the term of this patent is extended or adjusted under 35 U.S.C. 154(b) by 0 days.

(21) Appl. No.: 09/847,106

(22) Filed: May 3, 2001

(65) Prior Publication Data

US 2002/0162540 A1 Nov. 7, 2002

(51) Int. Cl.⁷ ............................................. F02D 43/04
(52) U.S. Cl. ................... 123/481; 123/399; 123/406.23; 123/198 F
(58) Field of Search .................... 123/481, 406.23, 123/198 F, 399

(56) References Cited

U.S. PATENT DOCUMENTS

| 4,172,434 | A | * | 10/1979 | Coles .................... 123/198 F |
| 5,099,816 | A | * | 3/1992 | Ohga et al. .............. 123/198 F |
| 5,337,720 | A | * | 8/1994 | Murakami et al. .......... 123/481 |
| 5,374,224 | A | * | 12/1994 | Huffmaster et al. ...... 123/198 F |
| 5,437,253 | A | * | 8/1995 | Huffmaster et al. ......... 123/399 |
| 5,481,461 | A | * | 1/1996 | Miyamoto et al. ....... 123/198 F |
| 5,492,100 | A | * | 2/1996 | Ishii et al. .................. 123/481 |
| 5,727,527 | A | * | 3/1998 | Mueller et al. .......... 123/198 F |
| 5,992,390 | A | * | 11/1999 | Moyer .................... 123/198 F |
| 6,125,812 | A | * | 10/2000 | Garabedian ............. 123/198 F |
| 6,336,071 | B2 | * | 1/2002 | Grizzle et al. .............. 123/481 |
| 6,431,154 | B1 | * | 8/2002 | Inoue ..................... 123/198 F |
| 2001/0013330 | A1 | * | 8/2001 | Grizzle et al. .............. 123/481 |

* cited by examiner

*Primary Examiner*—Erick Solis
(74) *Attorney, Agent, or Firm*—Christopher DeVries

(57) ABSTRACT

An engine control system including a variable displacement internal combustion engine, a plurality of cylinders located in the internal combustion engine, a plurality of fuel injectors for providing fuel to the plurality of cylinders, a plurality of valves coupled to the plurality of cylinders, the plurality of valves controlling the air flow in and out of the cylinders, an actuation apparatus for actuating the plurality of valves, an intake manifold coupled to the internal combustion engine, a throttle coupled to the intake manifold, a controller electronically coupled to the fuel injectors, an accelerator pedal position sensor electronically coupled to the controller, and where the controller determines the number of the cylinders to provide with fuel and air and a desired engine output torque based on at least the accelerator pedal position sensor and the controller controls the throttle to control the amount of air entering the intake manifold, where the controller is capable of eliminating torque disturbances upon changes in displacement of the engine.

15 Claims, 4 Drawing Sheets

Signal timing during Deactivation

METHOD AND APPARATUS FOR DEACTIVATING AND REACTIVATING CYLINDERS FOR AN ENGINE WITH DISPLACEMENT ON DEMAND

TECHNICAL FIELD

The present invention relates to the control of internal combustion engines. More specifically, the present invention relates to methods and apparatus to provide for the control of a variable displacement internal combustion engine.

BACKGROUND OF THE INVENTION

Present regulatory conditions in the automotive market have led to an increasing demand to improve fuel economy and reduce emissions in present vehicles. These regulatory conditions must be balanced with the demands of a consumer for high performance and quick response in a vehicle. Variable displacement internal combustion engines (ICEs) provide for improved fuel economy and torque on demand by operating on the principal of cylinder deactivation. During operating conditions that require high output torque, every cylinder of a variable displacement ICE is supplied with fuel and air (also spark, in the case of a gasoline ICE) to provide torque for the ICE. During operating conditions at low speed, low load and/or other inefficient conditions for a variable displacement ICE, cylinders may be deactivated to improve fuel economy for the variable displacement ICE and vehicle. For example, in the operation of a vehicle equipped with an eight cylinder ICE, fuel economy will be improved if the ICE is operated with only four cylinders during low torque operating conditions by reducing throttling losses. Throttling losses, also known as pumping losses, are the extra work that an ICE must perform to pump air around the restriction of a relatively closed throttle plate and pump air from the relatively low pressure of an intake manifold through the ICE and out to the atmosphere. The cylinders that are deactivated will not allow air flow through their intake and exhaust valves, reducing pumping losses by forcing the ICE to operate at a higher throttle plate angle and a higher intake manifold pressure. Since the deactivated cylinders do not allow air to flow, additional losses are avoided by operating the deactivated cylinders as "air springs" due to the compression and decompression of the air in each deactivated cylinder.

Previous variable displacement ICEs suffered from driveability issues created by their control systems. A transition in a previous variable displacement eight cylinder ICE to six or four cylinder operation created noticeable torque disturbances that affected the operation of the vehicle. These torque disturbances were generally considered undesirable by consumers.

The inability to control throttle position as a function of displacement in previous variable displacement ICEs contributed to the problem of torque disturbances. Previous variable displacement ICEs were equipped with conventional pedal-throttle-wire couplings that required different pedal positions for the operation of a fully displaced ICE and a partially displaced ICE. The amount of air flow through the throttle required to generate the same torque for a fully displaced and partially displaced operation was different, requiring the physical position of the throttle plate and accelerator pedal to also be different in the various operating configurations for a variable displacement ICE. Accordingly, the amount of movement in the accelerator pedal required to change the amount of torque for a fully displaced and partially displaced engine was also different. These differences in accelerator pedal operation, to generate the same torque for different modes of operation for a previous variable displacement engine, were nuisances to the operator of the vehicle.

The introduction of new engine control devices such as electronic throttle control (ETC), engine controllers, position sensors for pedal controls, and other electronics has enabled tighter control over more functions of an ICE. It is an object of the present invention to provide a variable displacement whose operation is transparent to the operator of a vehicle.

SUMMARY OF THE INVENTION

The present invention includes methods and apparatus that allow the operation of a vehicle with a variable displacement engine to be transparent to a vehicle operator. In the preferred embodiment of the present invention, an eight-cylinder internal combustion engine (ICE) may be operated as a four-cylinder engine by deactivating four cylinders. The cylinder deactivation occurs as a function of load or torque demand by the vehicle. An engine or powertrain controller will determine if the ICE should enter four-cylinder mode by monitoring the load and torque demands of the ICE. If the ICE is in a condition where it is inefficient to operate with the full complement of eight cylinders, the controller will deactivate the mechanisms operating the valves for the selected cylinders and also shut off fuel (and possibly spark in the case of a gasoline engine) to the cylinders. The deactivated cylinders will thus function as air springs to reduce pumping losses.

The transition between eight cylinders to four cylinders or four cylinders to eight cylinders will create changes in the air flow through the throttle plate into the ICE that also affect the torque output of the ICE. The method and apparatus of the present invention uses ETC and control of spark advance/retard to maintain the same engine torque during the cylinder deactivation and reactivation processes for the variable displacement ICE. Correct implementation and integration of the control schemes will allow for a seamless transition from all cylinders firing (reactivation) to half the cylinders firing (deactivation) without a torque disturbance.

DESCRIPTION OF THE PREFERRED EMBODIMENT

Figure 1:
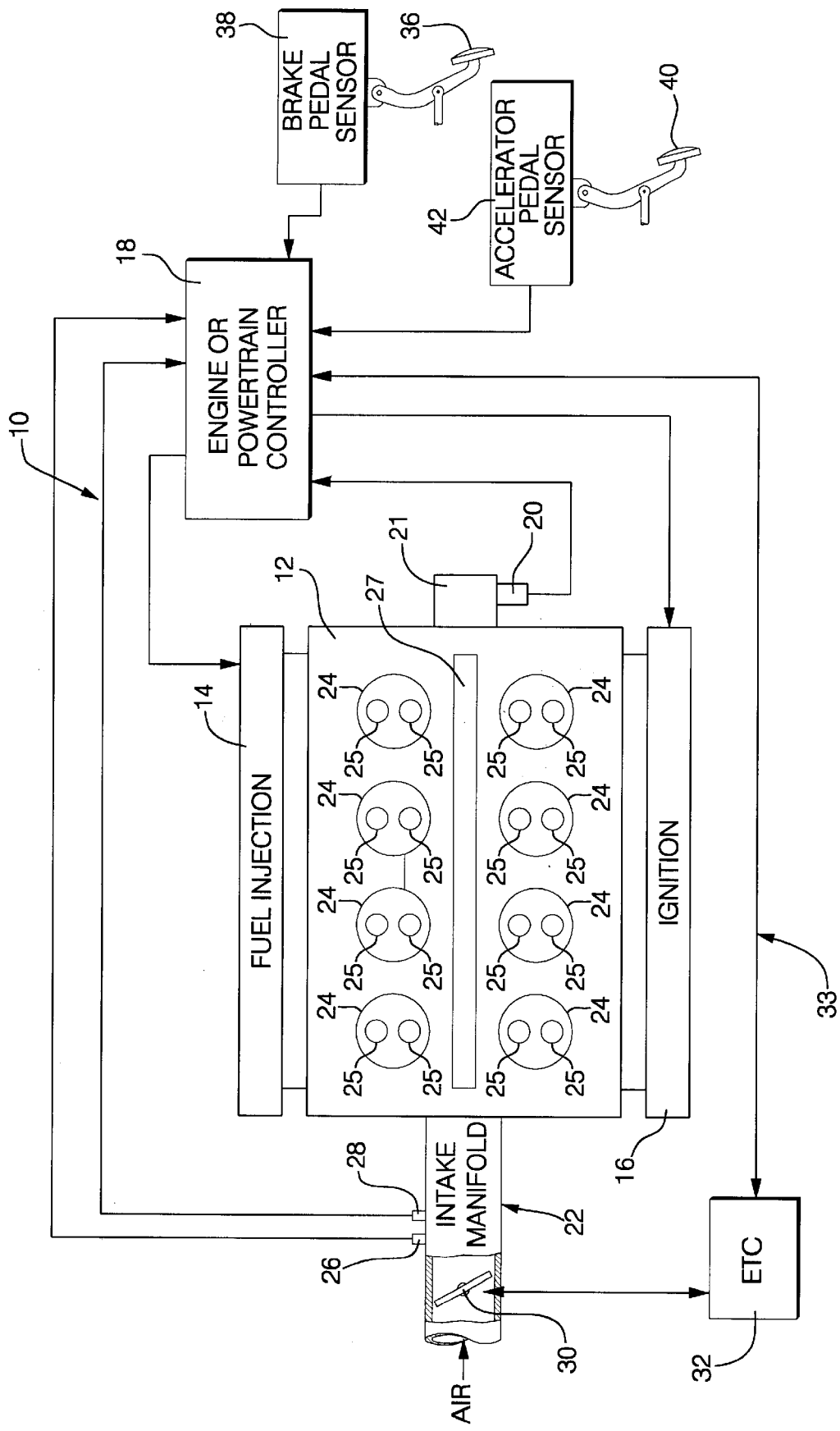
FIG. 1 is a diagrammatic drawing of the control system of the present invention.

FIG. 1 is a diagrammatic drawing of the vehicle control system 10 of the present invention. The control system 10 includes a variable displacement ICE 12 having fuel injectors 14 and spark plugs 16 controlled by an engine or powertrain controller 18. The ICE 12 may comprise a gasoline ICE or any other ICE known in the art. The ICE 12 crankshaft 21 speed and position are detected by a speed and position detector 20 that generates a signal such as a pulse train to the engine controller 18. An intake manifold 22 provides air to the cylinders 24 of the ICE 10, the cylinders 24 having valves 25. The valves 25 are further coupled to an actuation apparatus such as a camshaft 27 used in an overhead valve or overhead cam configuration that may be physically coupled and decoupled to the valves 25 to shut off air flow through the cylinders 24. An air flow sensor 26 and manifold air pressure sensor 28 detect the air flow and air pressure within the intake manifold 22 and generate signals to the powertrain controller 18. The airflow sensor 26 is preferably a hot wire anemometer, and the pressure sensor 28 is preferably a strain gauge.

An electronic throttle 30 having a throttle plate controlled by an electronic throttle controller 32 controls the amount of air entering the intake manifold 22. The electronic throttle 30 may utilize any known electric motor or actuation technology in the art including, but not limited to, DC motors, AC motors, permanent magnet brushless motors, and reluctance motors. The electronic throttle controller 32 includes power circuitry to modulate the electronic throttle 30 and circuitry to receive position and speed input from the electronic throttle 30. In the preferred embodiment of the present invention, an absolute rotary encoder is coupled to the electronic throttle 30 to provide speed and position information to the electronic throttle controller 32. In alternate embodiments of the present invention, a potentiometer may be used to provide speed and position information for the electronic throttle 30. The electronic throttle controller 32 further includes communication circuitry such as a serial link or automotive communication network interface to communicate with the powertrain controller 18 over an automotive communication network 33. In alternate embodiments of the present invention, the electronic throttle controller 32 will be fully integrated into the powertrain controller 18 to eliminate the need for a physically separate electronic throttle controller.

A brake pedal 36 in the vehicle is equipped with a brake pedal sensor 38 to determine the frequency and amount of pressure generated by an operator of the vehicle on the brake pedal 36. The brake pedal sensor 38 generates a signal to the powertrain controller 18 for further processing. An accelerator pedal 40 in the vehicle is equipped with a pedal position sensor 42 to sense the position of the accelerator pedal. The pedal position sensor 42 signal is also communicated to the powertrain controller 18 for further processing. In the preferred embodiment of the present invention, the brake pedal sensor 38 is a strain gauge and the pedal position sensor 42 is an absolute rotary encoder.

Figure 2:
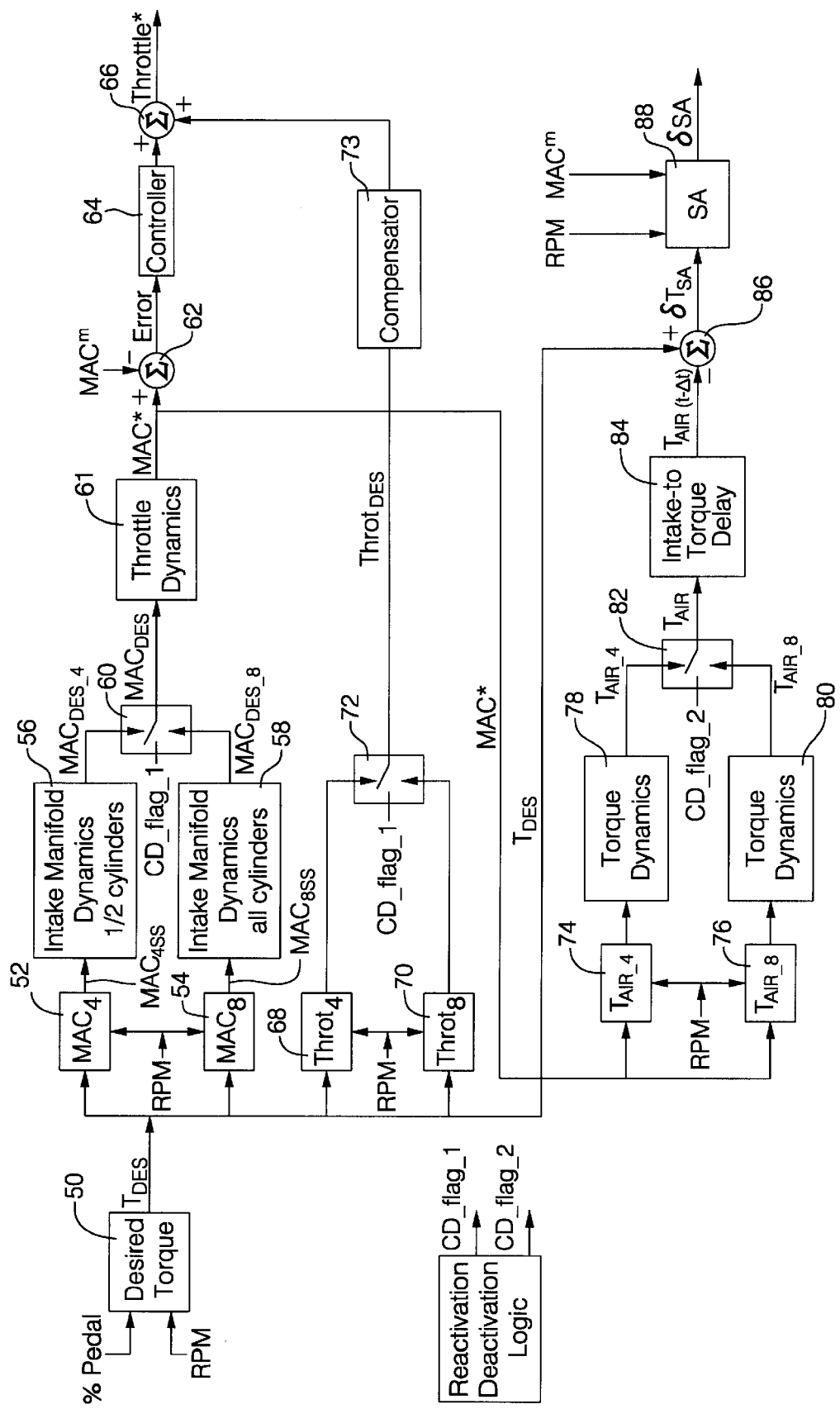
FIG. 2 is a process control diagram for the control system of the present invention.

FIG. 2 is a process control diagram for the control system 10 of the present invention. The control system 10 of the present invention is based on controlling the position of the electronic throttle 30 and spark advance/retard to eliminate torque transients generated by the deactivation and activation of cylinders 24 in the ICE 12. The powertrain controller 18 and electronic throttle controller 32 of the present invention include software to execute the methods of the present invention.

Referring to FIG. 2, at block 50 of the process diagram, the powertrain controller 18 determines the accelerator pedal 40 position from the signal generated by the pedal position sensor 42. The powertrain controller 18 further determines the rotations per minute (RPMs) of the ICE 12 crankshaft 21 from the pulse train generated from crankshaft speed sensor 20. The powertrain controller 18 takes the acceleration pedal 40 position and the speed of the crankshaft 21 and determines a desired ICE 12 torque ($T_{DES}$). The determination of the $T_{DES}$ is preferably executed using a lookup table in the powertrain controller 18 memory. $T_{DES}$ will be used as a load variable throughout the control system of the present invention. $T_{DES}$ is the fundamental load variable of a torque-based engine control strategy. $T_{DES}$ can be characterized as the amount of torque that the ICE 12 in a fully displaced operating mode would produce with a given throttle position and engine speed, or it may be calculated such that given an accelerator pedal 40 position the ICE 12 produces sufficient torque for a desired vehicle performance range.

At block 52, the powertrain controller 18 computes the steady-state mass-air/cylinder $MAC_4$ needed to produce the desired torque in the ICE 12 with only half (preferably four for an eight-cylinder ICE) of the cylinders 24 activated. The term activated for a cylinder 24 will be characterized as supplying a cylinder 24 with air, fuel and spark or any permutation thereof. At block 54, the powertrain controller 18 computes the $MAC_8$ needed to produce the desired torque in the ICE 12 with all of the cylinders 24 activated. The MAC at blocks 52 and 54 is preferably determined by using the $T_{DES}$ and the crankshaft 21 RPM in conjunction with a lookup table stored in the powertrain controller 18 memory.

At block 56, a model of the intake manifold 22 filling dynamics with only half the cylinders 24 activated is constructed. The model functions as a unity gain filter. The purpose of 56 is to produce the correct MAC trajectory as a function of time. At block 58, a model of the intake manifold 22 filling dynamics with all of the cylinders 24 activated is constructed. The output of block 56 is the MAC trajectory desired for half the cylinders 24 enabled ($MAC_{4DES}$), and the output of block 58 is the MAC desired for all of the cylinders 24 enabled ($MAC_{8DES}$). A discrete software switch 60 will determine whether the MAC desired for partial or full displacement of the ICE 12 is forwarded to block 61. The state of the software switch 60 is determined by the displacement of the ICE 12 and a cylinder deactivation flag CD_flag_1 (operation of CD_flag_1 will be described below in the specification). Accordingly, when the ICE 12 is operating with only half the cylinders 24, the $MAC_{4DES}$ from block 56 will be transferred to block 61 as $MAC_{DES}$, and when the ICE 12 is operating with all the cylinders 24, the $MAC_{8DES}$ from block 58 will be transferred to block 61 as $MAC_{DES}$.

At block 61, the powertrain controller 18 will use a set of dynamic models of the electronic throttle 30 to further process the $MAC_{DES}$ desired from blocks 56 and 58 into a dynamic MAC desired ($MAC^*$). The $MAC^*$ differs from the $MAC_{DES}$ by the additional dynamics associated with the physical movement of the throttle.

At the summing junction 62, the MAC measured ($MAC^m$) and the $MAC^*$ are processed to produce an MAC error. The MAC error at block 64 is input to a control algorithm in the powertrain controller 18 to produce a desired electronic throttle 30 output control signal (Throttle*). The control algorithm includes, but is not limited to, a proportional-integral control algorithm, a proportional-integral-derivative control algorithm, a fuzzy logic algorithm, a control algorithm utilizing neural networks, and/or any control-theory based algorithm. The desired electronic throttle output control signal determines the speed and positioning of the electronic throttle 30. The output control signal is communicated from the powertrain controller 18 to the electronic throttle controller 32, via a serial link, or in alternate embodiments an analog signal. A feedforward factor ($Throt_{DES}$) is added to the electronic throttle output control signal at summing junction 66. The $Throt_{DES}$ value is compensated at block 73 to provide for desired air dynamics for displacement changes. The feedforward factor will drive the throttle plate 30 to the position required to deliver $MAC^*$ to the cylinders and thus the desired MAC will be reached more quickly.

The feedforward factor added at summing junction 66 is generated by the following control method. At block 68, the powertrain controller 18 computes the electronic throttle 30 position (or area) $Throt_4$ needed to produce the $T_{DES}$ based in the ICE 12 with only half (preferably four for an eight-cylinder ICE) of the cylinders 24 activated. At block 70, the powertrain controller 18 computes the electronic throttle 30 position $Throt_8$ needed to produce the $T_{DES}$ in the ICE 12 with all of the cylinders 24 activated. The desired throttle position at blocks 68 and 70 is preferably determined by using the $T_{DES}$ and the crankshaft 21 RPM feedback in conjunction with a lookup table stored in the powertrain controller 18 memory. A discrete software switch 72 will determine whether the electronic throttle 30 position desired for partial or full displacement of the ICE 12 is forwarded to summing junction 66. The state of the software switch is determined by the displacement of the ICE 12 and the cylinder deactivation flag CD_flag_1. Accordingly, when the ICE 12 is operating with only half the cylinders 24, the desired electronic throttle 30 position $Throt_4$ generated at block 68 will be transferred to summing junction 66, and when the ICE 12 is operating with all the cylinders 24, the desired electronic throttle 30 position $Throt_8$ generated at block 70 will be transferred to summing junction 66.

The MAC* output from block 61 will be transferred to the spark control advance/retard portion of the control system of the present invention to smooth the activation and deactivation of cylinders 24 in the ICE 12. At block 74, the powertrain controller 18 computes the torque of the ICE 12 with only half (preferably four for an eight-cylinder ICE) of the cylinders 24 activated using the MAC* output from block 61 and crankshaft RPM in conjunction with a lookup table in the powertrain controller 18 memory. At block 76, the powertrain controller 18 computes the torque of the ICE 12 with all of the cylinders 24 activated using the MAC* output from block 61 and crankshaft RPM in conjunction with a lookup table in the powertrain controller 18 memory.

At block 78, a model of the torque dynamics as a function of cylinder 24 air and engine speed with only half the cylinders 24 activated is constructed. The model of block 78 functions as a dynamic filter, since there can be a slight lag in torque production even for an instantaneous change in MAC*, due, for example, to transient fueling dynamics. At block 80, a model of torque dynamics as a function of the cylinder air and engine speed with all of the cylinders 24 activated is constructed. The model of block 80 also functions as a dynamic filter, since there can be a slight lag in torque production even for an instantaneous change in MAC*. A discrete software switch 82 will determine whether the torque expected for partial or full displacement of the ICE 12 is forwarded to block 84. The state of the software switch is determined by the displacement of the ICE 12 and a cylinder deactivation flag CD_flag_2. Accordingly, when the ICE 12 is operating with only half the cylinders 24 activated, the expected torque generated at block 78 will be transferred to block 84, and when the ICE 12 is operating with all the cylinders 24, the expected torque generated at block 80 will be transferred to block 84.

At block 84, the powertrain controller executes an intake to torque delay algorithm that accounts for the time it takes between when the mass of air (MAC) is computed and when the power stroke (at which the torque is produced) occurs. The delayed expected output torque from block 84 is input to summing junction 86 along with the $T_{DES}$ generated at block 50 to generate the desired change in torque required from a change in spark advance/retard $\delta T_{SA}$. The $\delta T_{SA}$ is processed at block 88 by the powertrain controller 18 in conjunction with crankshaft 21 RPMs and the $MAC^m$ to generate a spark advance/retard command $\delta_{SA}$.

Figure 3:
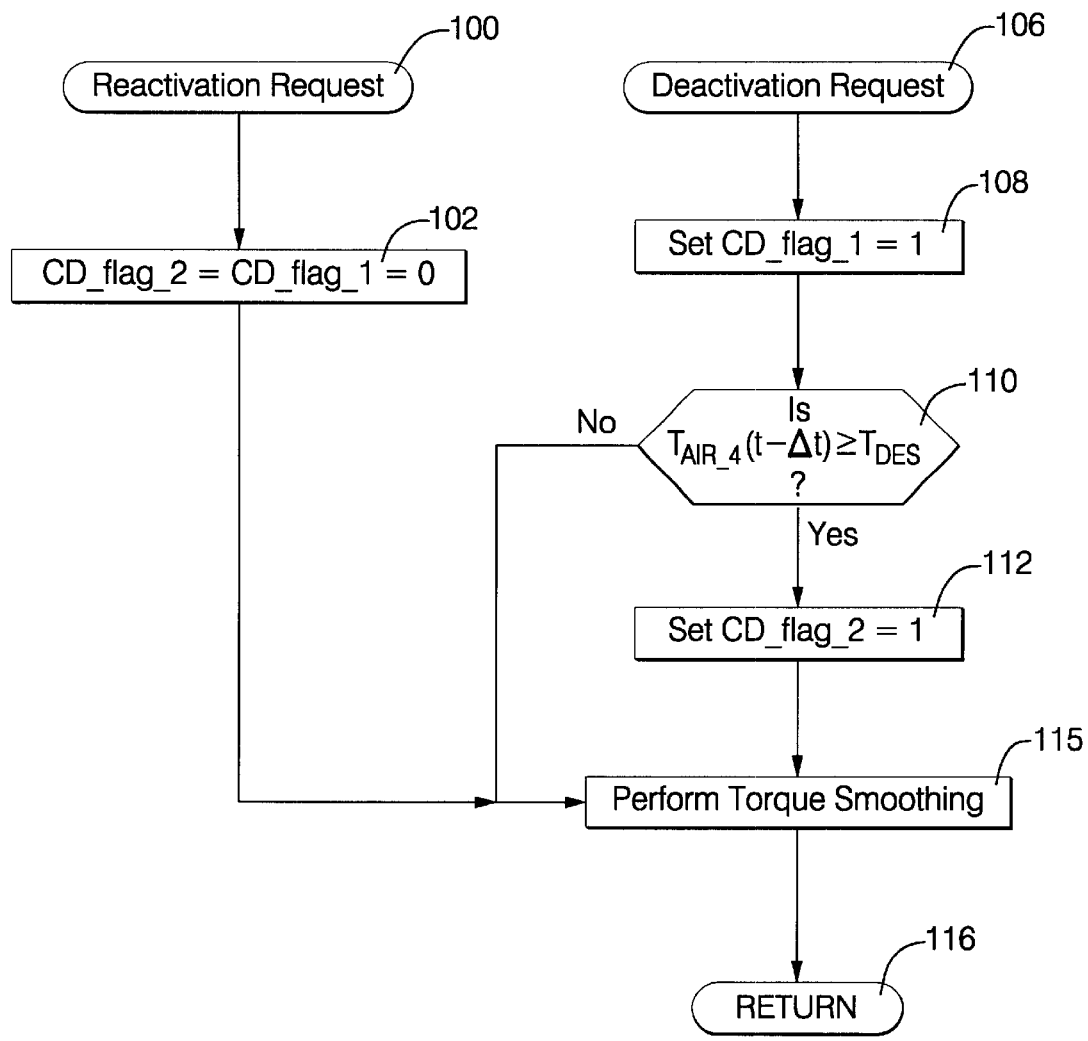
FIG. 3 is a flowchart of a preferred method for determining the operation of the control system.

FIG. 3 includes flowcharts of the reactivation and deactivation requests from the powertrain controller to set the flags CD_flag_1 and CD_flag_2 previously referenced in FIG. 2. When it is necessary to reactivate the deactivated cylinders, the subroutine characterized by blocks 100 through 104 is called. At block 100, the powertrain controller 18 generates a reactivation request and sets CD_flag_2=CD_flag_1=0 at block 102. For a reactivation request, both flags are set to zero at the same time, by block 102. Next, the powertrain controller 18 returns to 115 to run the control process represented by the block diagram in FIG. 2. At block 116, the powertrain controller returns to normal processing. Accordingly, when the control process represented by the block diagram in FIG. 2 is run, both CD_flag_1 and CD_flag_2 will be equal to zero until a deactivation process occurs.

When the powertrain controller 18 determines that it can deactivate one-half of the cylinders 24, it generates a deactivation request and calls the subroutine initiated by block 106. At block 108, CD_flag_1 is set to 1 to indicate the ICE 12 is ready to operate with only half the cylinders 24 activated. Block 110 determines if the $T_{AIR\_4}$ (t−Δt) generated at block 78 is greater than or equal to $T_{DES}$. If $T_{AIR\_4}$ (t−Δt)<$T_{DES}$, then the electronic throttle 30 has not had enough time to move to a partial displacement position and the ICE 12 would not be able to produce sufficient torque with respect to $T_{DES}$. (For reference, an increased electronic throttle 30 position indicates greater air flow and a decreased electronic throttle 30 position indicates lesser air flow.) In this case, block 115 is executed to run the control process represented by the block diagram in FIG. 2, and then the powertrain controller 18 returns to normal processing at block 116. Accordingly, when the control process represented by the block diagram in FIG. 2 is executed, CD_flag_1=1 and CD_flag_2=0, so that the powertrain controller 18 will increase the electronic throttle 30 position and hence the MAC*. The flag CD_flag_2 will be set=0, and switch 82 will pass $T_{AIR\_8}$ as $T_{AIR}$ which is greater than $T_{DES}$, and blocks 84–88 will retard the spark advance, thus negating the extra torque produced by the increased electronic throttle 30 position. If at 110 $T_{AIR\_4}$ (t−Δt)>=$T_{DES}$, the electronic throttle 30 has moved far enough to generate the $T_{DES}$, then set CD_flag_2=1 and execute block 112 with CD_flag_1=1 and CD_flag_2=1. In this case, the output of block 84 [$T_{AIR}$(t−Δt)] will be equal to or greater than $T_{DES}$ and blocks 86–88 will generate a zero value for SA. The net result is that when the torque production of the ICE 12 drops due to running on half the cylinders 24, there is an immediate compensating torque increase by removing spark retard.

Figure 4:
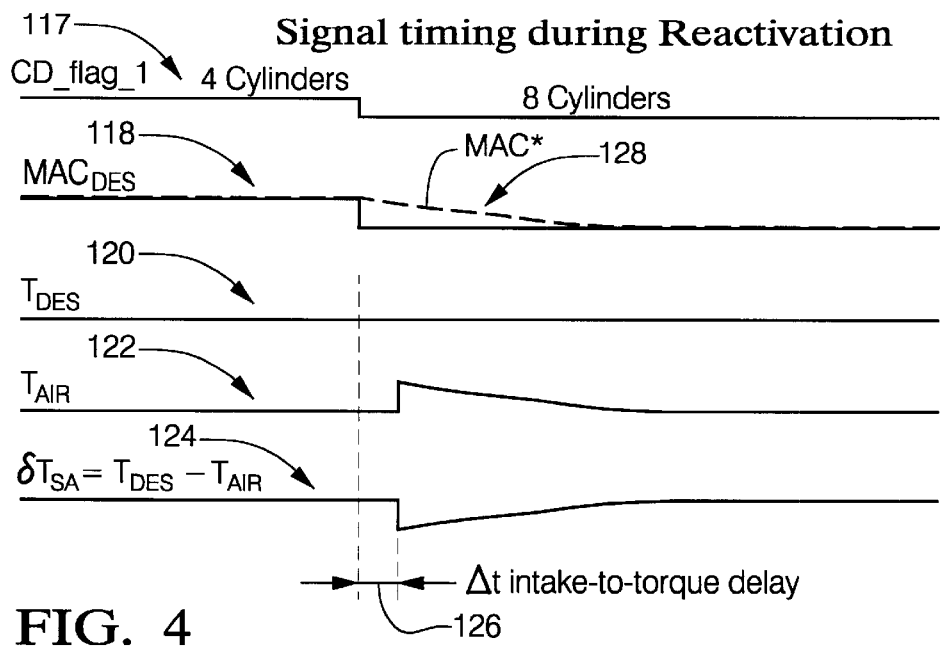
FIGS. 4 and 5 are timing diagrams of the cylinder activation and reactivation process.

FIG. 4 is a timing diagram generally illustrating the interaction between the plots for the signals CD_flag_1 117 (input to the blocks 60 and 72), $MAC_{DES}$ 118, MAC* 128, $T_{DES}$ 120, $T_{AIR}$ 122, and δTSA 124 for signal timing during reactivation of the cylinders 24 for the ICE 12. As can be seen in FIG. 4, CD_flag_1 on the plot 116 indicates a transition for the ICE 12 from four-cylinder to eight-cylinder operation. In response to the reactivation of cylinders, the $MAC_{DES}$ changes instantaneously to a smaller value. Due to the throttle dynamics generated at block 61 and the manifold dynamics generated at block 58, the value of $MAC_{DES}$ will decrease along the slope of the plot 128 as MAC*. The $MAC_{DES}$ will decrease because the displacement of the ICE 12 has increased and the MAC needed to generate the same $T_{DES}$ in a four-cylinder ICE is greater than that of an eight-cylinder ICE. As can be seen by plot 120, $T_{DES}$ is held constant. The signal $T_{AIR}$ output of block 82 represents the torque generated by the MAC, assuming nominal spark advance and a stoichiometric air-fuel ratio. FIG. 4 illustrates that after a period of time Δt 126, $T_{AIR}$ suddenly increases. This is because initially MAC* is greater than $MAC_{DES}$ (which is the value needed for $T_{AIR}$ to equal $T_{DES}$), and after the initial increase, $T_{AIR}$ decreases as MAC* decreases. In order to avoid the disturbance in $T_{AIR}$ from being felt by the driver, it is necessary to produce an equal and opposite torque disturbance. This is the signal represented by the plot 124 $\delta T_{SA}$ and is produced by retarding the spark advance as determined in block 88.

Figure 5:
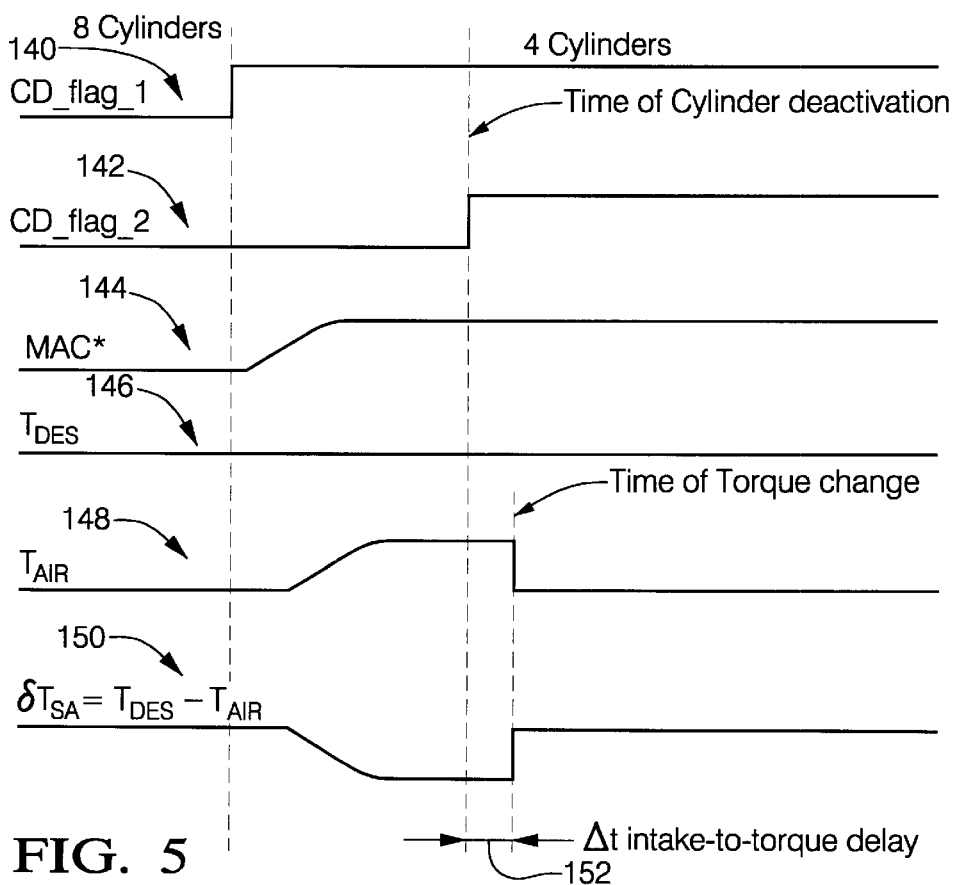

FIG. 5 is a signal timing diagram during deactivation of cylinders 24 for the ICE 12. As can be seen in FIG. 5, CD_flag_1 on plot 140 indicates a transition from eight-cylinder to four-cylinder operation. A plot 144 of MAC* is shown as increasing due to the need for more MAC to generate the same $T_{DES}$ (as shown by plot 146) in four-cylinder operation versus eight-cylinder operation. However, if MAC* is increased while the ICE 12 is still operating on eight cylinders, the torque would increase as shown in $T_{AIR}$ plot 148. To counter this unwanted increase in torque, $\delta T_{SA}$ is decreased as shown in plot 150. Once MAC* has reached its desired new value, as shown in the plot 144, the signal CD_flag_2 illustrated in plot 142 is raised, indicating that the ICE 12 is ready to begin operating on four cylinders. After the intake-to-torque delay Δt 152, the torque $T_{AIR}$ falls as shown in the plot 148, and the torque $\delta T_{SA}$ mirrors $T_{AIR}$ as shown in the plot 150. Since the observed torque is a sum of $T_{AIR}$ and $\delta T_{SA}$, it remains constant throughout the deactivation.

While this invention has been described in terms of some specific embodiments, it will be appreciated that other forms can readily be adapted by one skilled in the art. Accordingly, the scope of this invention is to be considered limited only by the following claims.

What is claimed is:

1. An engine control system comprising:
   a variable displacement internal combustion system;
   a plurality of cylinders located in said variable displacement internal combustion engine;
   a plurality of fuel injectors for providing fuel to said plurality of cylinders;
   a plurality of valves coupled to said plurality of cylinders, said plurality of valves controlling the air flow in and out of said plurality of cylinders;
   an actuation apparatus for actuating said plurality of valves;
   an intake manifold coupled to said variable displacement internal combustion engine;
   a throttle coupled to said intake manifold;
   a controller electronically coupled to said fuel injectors;
   a mass flow air model contained in said controller for modeling the air flow into said variable displacement internal combustion engine in a fully displaced operating mode and a partially displaced operating mode;
   an accelerator pedal position sensor electronically coupled to said controller; and
   wherein said controller determines the number of said cylinders to provide with fuel and air and a desired engine output torque based on at least said accelerator pedal position sensor, and said controller controls said throttle to control the amount of air entering said intake manifold based upon said mass flow air model, whereby said controller is capable of eliminating torque disturbances upon changes in displacement of said variable displacement internal combustion engine.

2. The engine control system of claim 1 further comprising spark plugs for igniting said fuel provided by said fuel injectors.

3. The engine control system of claim 1 wherein said throttle is an electronic throttle.

4. The engine control system of claim 1 wherein said accelerator pedal position sensor is an encoder.

5. The engine control system of claim 1 wherein said variable displacement internal combustion engine is a gasoline engine.

6. The engine control system of claim 1 wherein said variable displacement internal combustion engine includes at least two cylinders.

7. The engine control system of claim 1 wherein said variable displacement internal combustion engine is a V8 engine.

8. The engine control system of claim 1 wherein said actuation apparatus includes a decoupling apparatus that may couple and decouple from said plurality of valves.

9. The engine control system of claim 1 further including an airflow sensor to detect airflow through said intake manifold.

10. A method of controlling a variable displacement engine comprising:
    providing fuel injectors for the engine;
    providing spark plugs for the engine;
    providing an electronic control module;
    providing a mass flow air model in the electronic control module;
    providing an electronic throttle;
    providing an accelerator pedal position sensor;
    providing an air flow sensor;
    varying the displacement of the engine by deactivating at least one of the fuel injectors and the spark plugs for the engine;
    measuring the air flow into the engine with the air flow sensor;
    determining a first desired torque using accelerator pedal position and engine speed; and
    adjusting the electronic throttle to smooth engine disturbances caused by varying the displacement of the engine based upon the mass flow air model.

11. The method of claim 10 further comprising adjusting spark advance to smooth engine disturbances caused by varying the displacement of the variable displacement internal combustion engine.

12. A method of controlling a variable displacement internal combustion engine comprising:
    providing fuel injectors for the variable displacement internal combustion engine;
    providing an electronic control module;
    providing an electronic throttle;
    providing an accelerator pedal position sensor;
    providing an air flow sensor;
    varying the displacement of the variable displacement internal combustion engine by deactivating at least one of said fuel injectors and said spark plugs for the variable displacement internal combustion engine;
    measuring the speed of the variable displacement internal combustion engine;
    determining a first desired torque using accelerator pedal position and engine speed;

determining a first mass-air/cylinder value needed to generate said first desired torque for the variable displacement internal combustion engine when it is partially displaced using the engine speed;

determining a second mass-air/cylinder value needed to generate said first desired torque for the variable displacement internal combustion engine when it is fully displaced using said engine speed;

generating a first intake manifold dynamic model to determine a first desired mass-air/cylinder value for the variable displacement internal combustion engine when it is partially displaced;

generating a second intake manifold dynamic model to determine a second mass-air/cylinder value for the variable displacement internal combustion engine when it is fully displaced;

converting said first or second desired mass-air/cylinder value to a desired dynamic mass-air/cylinder value;

measuring the mass-air/cylinder into the variable displacement internal combustion engine with said air flow sensor;

determining the difference between said desired dynamic mass-air/cylinder value and said measured mass-air/cylinder to generate an error value;

acting on said error with a controller to produce a first throttle value; and adding a second throttle value to said first throttle value to generate a throttle position command.

13. The method of claim 12 wherein said air flow sensor is a hot wire anemometer.

14. The method of claim 12 wherein said air flow sensor is a manifold pressure sensor, whereby a sensed pressure is processed into an air flow value.

15. The method of claim 12 wherein said second throttle value is generated by the method comprising the steps of:

computing a first steady-state torque value produced by the variable displacement internal combustion engine when it is partially displaced using said desired dynamic mass-air/cylinder value and the engine speed;

computing a second steady-state torque value produced by the variable displacement internal combustion engine when it is fully displaced using said desired dynamic mass-air/cylinder value and the engine speed;

generating a first torque dynamic model to determine a first dynamic torque value for the variable displacement internal combustion engine when it is partially displaced using said first steady-state torque value and said engine speed;

generating a second torque dynamic model to determine a second dynamic torque value for the variable displacement internal combustion engine when it is fully displaced using said second-steady state torque value and said engine speed;

delaying said first or second dynamic torque value to generate a delayed dynamic torque value;

determining the difference between said first desired torque value and said delayed dynamic torque value to generate a spark advance value; and generating a spark advance control value using said engine speed and said measured airflow to vary the torque output of the variable displacement internal combustion engine.

* * * * *